US008213795B2

(12) United States Patent
Han et al.

(10) Patent No.: US 8,213,795 B2
(45) Date of Patent: Jul. 3, 2012

(54) SYSTEMS AND METHODS OF POLARIZATION TIME CODING FOR OPTICAL COMMUNICATIONS (75) Inventors: Yan Han, Arlington, VA (US); Guifang Li, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 950 days.

(21) Appl. No.: 12/118,642

(22) Filed: May 9, 2008

(65) Prior Publication Data

US 2008/0279564 A1 Nov. 13, 2008

Related U.S. Application Data (60) Provisional application No. 60/916,900, filed on May 9, 2007.

(51) Int. Cl.
*H04B 10/00* (2006.01)
(52) U.S. Cl. ............... 398/65; 398/183; 398/184
(58) Field of Classification Search .......... 398/65, 398/182–184
See application file for complete search history.

(56) References Cited

U.S. PATENT DOCUMENTS

| 5,111,322 | A * | 5/1992 | Bergano et al. | 398/74 |
|---|---|---|---|---|
| 6,038,357 | A * | 3/2000 | Pan | 385/24 |
| 6,714,742 | B1 * | 3/2004 | Hayee et al. | 398/65 |
| 6,798,938 | B1 * | 9/2004 | Cao | 385/17 |
| 7,002,968 | B1 * | 2/2006 | Tomizawa et al. | 370/395.52 |
| 7,046,935 | B1 * | 5/2006 | Fang et al. | 398/147 |
| 7,623,064 | B2 * | 11/2009 | Calderbank et al. | 342/188 |
| 7,643,760 | B1 * | 1/2010 | Han et al. | 398/183 |
| 7,822,350 | B2 * | 10/2010 | Liu | 398/205 |
| 7,835,733 | B1 * | 11/2010 | Panzani et al. | 455/428 |
| 7,983,570 | B2 * | 7/2011 | Han et al. | 398/183 |
| 8,064,767 | B2 * | 11/2011 | Shpantzer et al. | 398/65 |
| 2002/0003641 | A1 * | 1/2002 | Hall et al. | 359/122 |
| 2002/0067883 | A1 * | 6/2002 | Lo | 385/24 |
| 2002/0093993 | A1 * | 7/2002 | LaGasse et al. | 370/536 |
| 2002/0191259 | A1 * | 12/2002 | Otani et al. | 359/176 |
| 2003/0035173 | A1 * | 2/2003 | Byers et al. | 359/135 |
| 2003/0194237 | A1 * | 10/2003 | Farries et al. | 398/102 |
| 2005/0286462 | A1 * | 12/2005 | Roh et al. | 370/328 |

(Continued)

OTHER PUBLICATIONS

Encode. (2001). In Hargrave's Communications Dictionary, Wiley. Retrieved from http://www.credoreference.com/entry/hargrave comms/encode.*

(Continued)

*Primary Examiner* — Nathan Curs
*Assistant Examiner* — Tanya Ngo
(74) *Attorney, Agent, or Firm* — Thomas, Kayden, Horstemeyer & Risley, LLP (57) ABSTRACT Systems and methods of polarization-time coding are disclosed. One method includes encoding information in orthogonal polarizations of light and correlated information in multiple time slots, and transmitting the information using the orthogonal polarizations in the time slots. Another method includes receiving a first input pair which specifies a first polarization state and a second input pair containing which specifies a second polarization state; transforming each input pair according to a matrix specifying a conjugate operation to produce four output pairs. The method further includes transmitting at a first time the first output pair using the first polarization state and the third output pair using the second polarization state. The method further includes transmitting at a second time the second output pair using the first polarization state and the fourth output pair using the second polarization state.

5 Claims, 6 Drawing Sheets

U.S. PATENT DOCUMENTS

| | | | |
|---|---|---|---|
| 2007/0245205 A1* | 10/2007 | Popovski et al. | 714/749 |
| 2008/0129564 A1* | 6/2008 | Kitayama et al. | 341/137 |
| 2009/0202016 A1* | 8/2009 | Seong et al. | 375/267 |
| 2009/0274469 A1* | 11/2009 | Yuki et al. | 398/152 |
| 2010/0028024 A1* | 2/2010 | Shpantzer et al. | 398/214 |
| 2010/0182988 A1* | 7/2010 | Roh et al. | 370/342 |
| 2011/0150478 A1* | 6/2011 | Winzer | 398/65 |

OTHER PUBLICATIONS

Encode. (2000). In Collins English Dictionary. Retrieved from http://www.credoreference.com/entry/hcengdict/encode.*

* cited by examiner

SYSTEMS AND METHODS OF POLARIZATION TIME CODING FOR OPTICAL COMMUNICATIONS

CROSS REFERENCE TO RELATED APPLICATIONS

This application claims the benefit of U.S. Provisional Application No. 60/916,900, filed May 9, 2007, which is incorporated by reference herein in its entirety.

FIELD OF THE DISCLOSURE

The present disclosure relates to optical communications, and more specifically to coding for coherent optical communications.

BACKGROUND

Communication using multiple transmitters and multiple receivers can be used to provide redundancy and thus to achieve reliability. Such systems also sometimes referred to as multiple input multiple output (MIMO) systems. Multiple spatially-diverse antennas have been used in wireless MIMO systems, and polarization can be used in optical MIMO systems to provide diversity and thus redundancy. Polarization diversity can address impairments in optical fiber such as cross-phase modulation (XPM) induced by polarization scattering, and also polarization-mode dispersion. Polarization diversity can also be used to address impairments in optical free-space communication, such as scattering and scintillatio. Polarization diversity uses multiple transmitters, each of which transmits using a different polarization state, thus transmitting redundant forms of the data to a receiver. The receiver can exploit the differences in the various received versions of the data to improve recovery of received data. However, conventional techniques employ multiple receivers as well as multiple transmitters, thus adding to the cost.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Various embodiments described herein use polarization multiple input, multiple output (MIMO) techniques in the optical domain. The techniques described herein can be applied to mitigate various impairments in optical fiber, such as polarization-mode dispersion and cross-phase modulation (XPM) induced by polarization scattering. These techniques can also be applied to mitigate impairments in free-space optical communication, such as scattering and scintillation.

Figure 1:
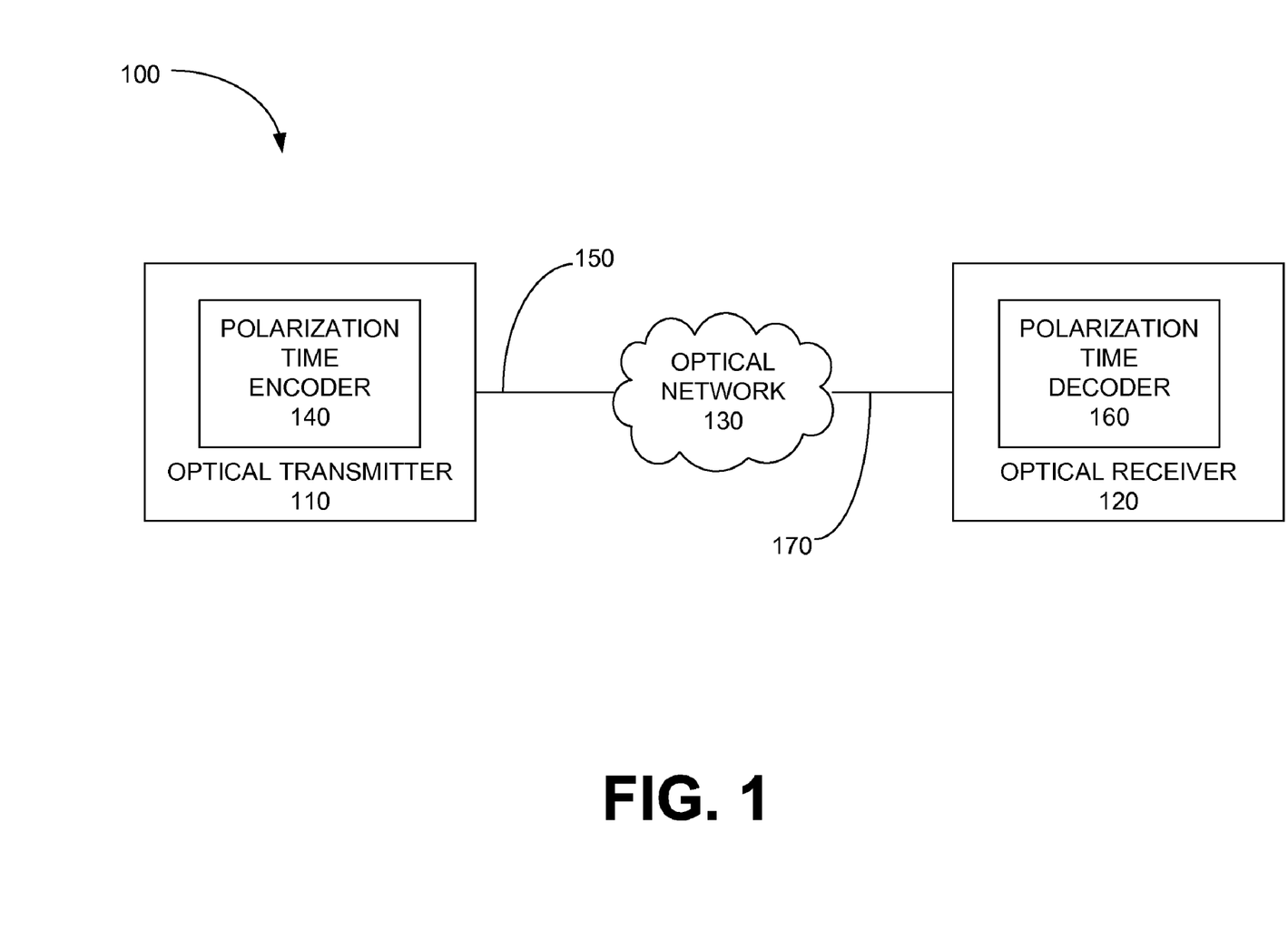
FIG. 1 is a block diagram of a communication system including an embodiment of a system and method of polarization time coding for optical communications.

FIG. 1 is a block diagram of a communication system including an embodiment of a system and method of polarization time coding for optical communications. System 100 includes an optical transmitter 110 and an optical receiver 120 communicatively coupled through an optical network 130. Optical transmitter 110 is coupled to optical network 130 through optical fiber 140. Optical receiver 120 is coupled to optical network 130 through optical fiber 150. Optical network 130 may include various components such as amplifiers, repeaters, multiplexers, etc., as understood by a person of ordinary skill in the art.

Optical transmitter 110 includes a polarization-time encoder 160. Optical receiver 120 includes a polarization-time decoder 170 which performs the inverse function of polarization-time encoder 160. As described in further detail in connection with FIGS. 3-5, the use of encoder 160 and decoder 170 allows optical transmitter 110 to transmit data using multiple polarization states while also allowing optical receiver 120 to include a single detector and to be insensitive to polarization. System 100 can thus be viewed as a polarization multiple-input, multiple output (PMIMO) system of the form 2×1: two (logical) transmitters and a single receiver. The redundancy provided by multiple polarization states allows the receiver to exploit the various received versions of the data, thus improving the reliability of communication. In particular, the encoding/decoding described herein reduces random polarization scattering, and the cross-phase modulation induced by the scattering. The encoding/decoding described herein can be used in transmission over optical fiber using single or multiple carriers. The multiple carriers can be generated optically, electrically, or a combination thereof. The encoding/decoding described herein can also be used to transmit in free space.

Figure 2:
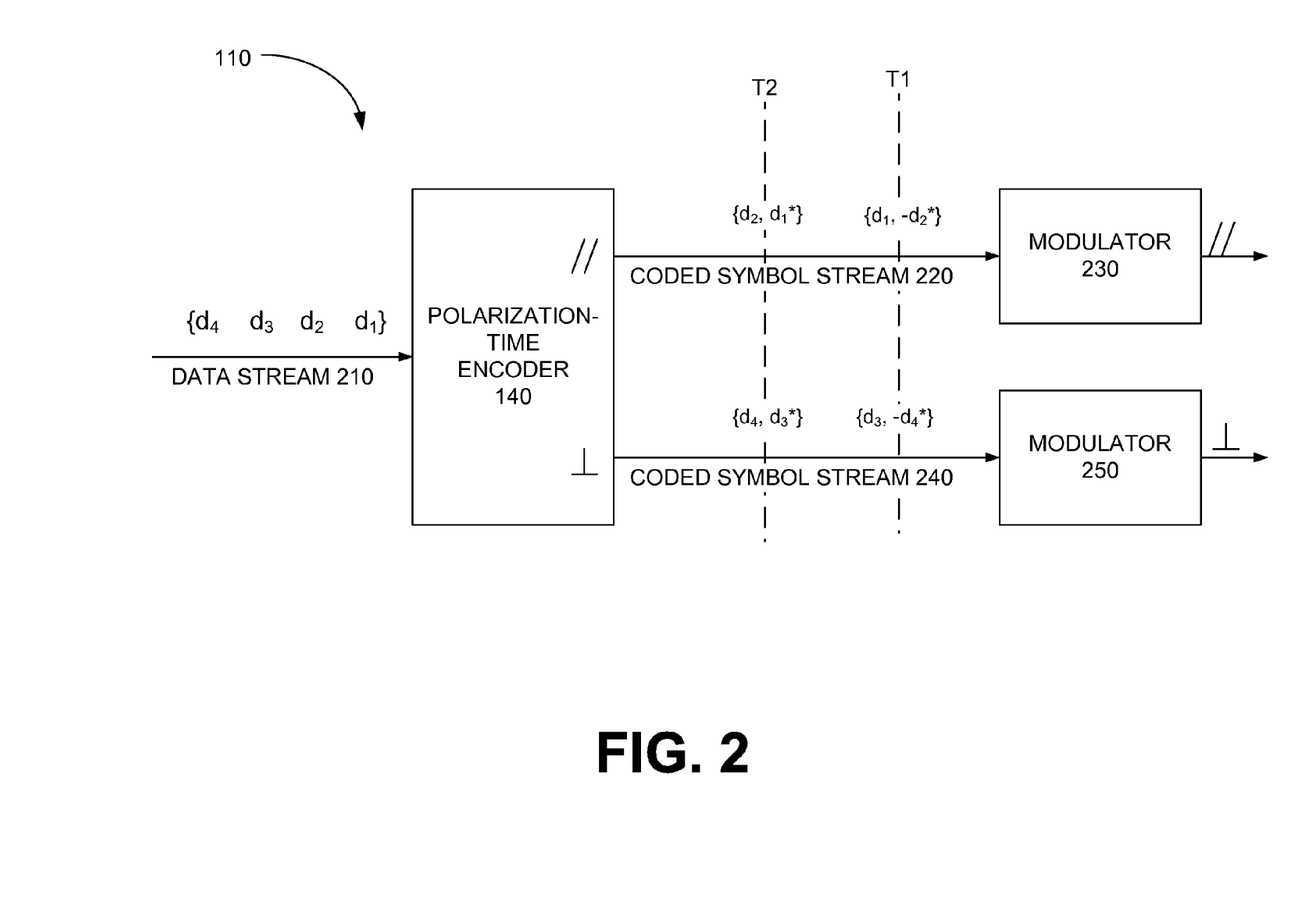
FIG. 2 is a flowchart describing operation of one embodiment of the optical transmitter from FIG. 1.

FIG. 2 is a flowchart describing operation of one embodiment of optical transmitter 110. The process begins at block 210, where data is encoded in two dimensions: in multiple orthogonal polarizations and in correlated time slots. At block 220, the encoded data is transmitted using respective ones of the orthogonal polarizations and in respective ones of the time slots. In some embodiments, the time slots are successive. The process is then complete.

Figure 3:
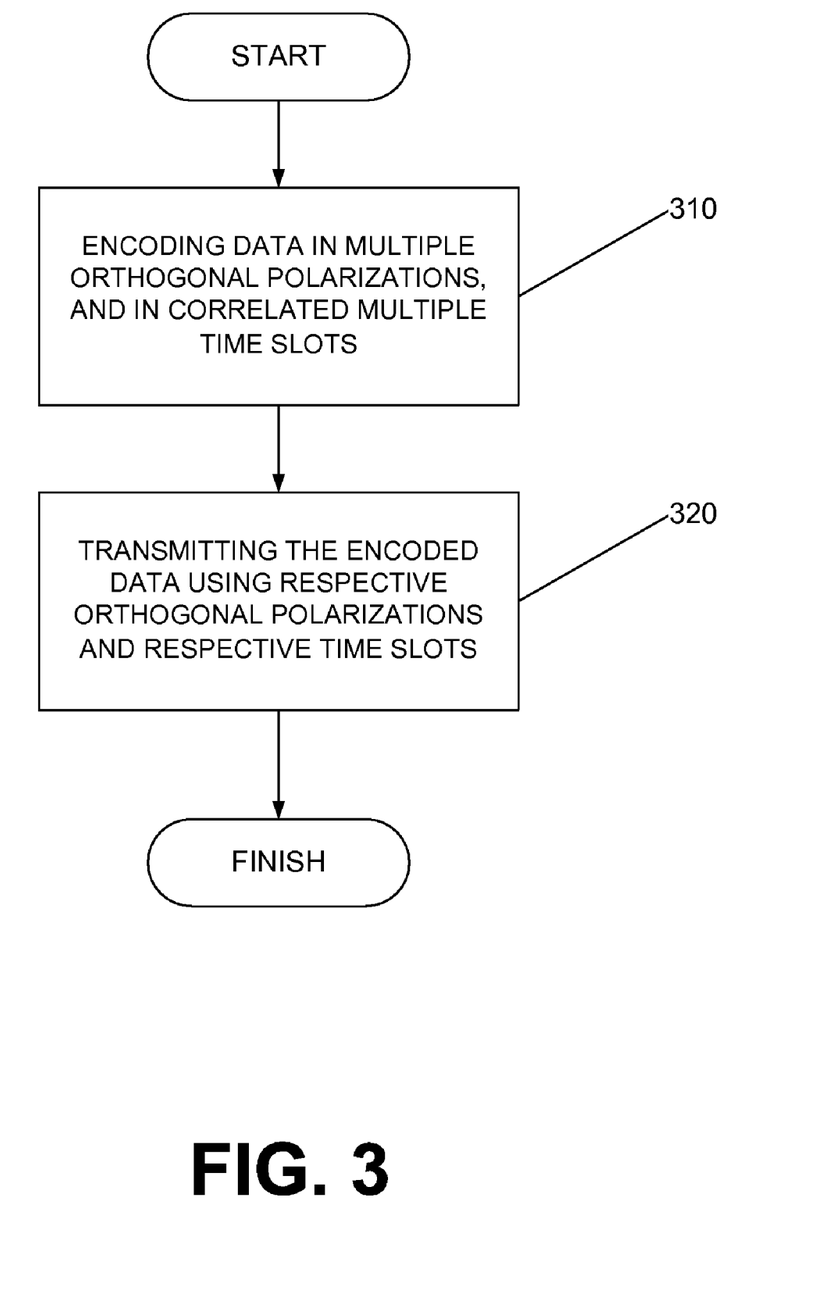
FIG. 3 is a block diagram of the optical transmitter of FIG. 1, showing further details of the operation of the polarization time encoder from FIG. 1.

The details of one embodiment of polarization-time encoder 160 will now be discussed in connection with FIG. 3. FIG. 3 is a block diagram of optical transmitter 110 from FIG. 1, showing further details of one embodiment of polarization-time encoder 160. A data stream 310 including {d1, d2}, {d3, d4} is supplied to polarization-time encoder 160. Each pair in the stream is a complex number associated with a polarization state. In some embodiments, the input pairs are uncoded symbols provided to polarization-time encoder 160 by a mapper (not shown), which maps a bit stream to an uncoded symbol stream.

Polarization-time encoder 160 generates a linear block code which encodes in one dimension by encoding data in orthogonal polarizations, and in another dimension by encoding correlated data in multiple time slots. A linear block code of length=2 will be discussed in connection with FIG. 3, but other linear block codes using the polarity and time dimensions are also contemplated.

In this example, each pair of inputs {z0, z1} in stream 310 is transformed into the matrix M $$\begin{bmatrix} z_0 & -z_1^* \\ z_1 & z_0^* \end{bmatrix},$$

where * represents the complex conjugate and each row represents a time slot (earliest time at the left). Polarization-time encoder 160 thus produces two streams of coded symbols, each associated with a respective polarization state. Symbols earliest in time are shown on the right. In the example of FIG. 3, coded symbol stream 320 corresponds to a parallel polarization state and is provided to modulator 330, while coded symbol stream 340 corresponds to a perpendicular polarization state and is provided to modulator 350. However, other polarization states are also contemplated.

In this example, polarization-time encoder 160 applies matrix operations to the first pair {d1,d2}, producing a first coded symbol {d1, −d2*} and a second symbol {d2, d1*}. At time T1, the first symbol {d1, −d2*} produced from the first pair is provided to modulator 330, for transmission using a first polarization state. At time T2, the second symbol {d2, d1*} produced from the first pair is provided to modulator 330, for transmission using the first polarization state.

The second input pair {d3,d4} is also coded using the matrix M to produce a first coded symbol {d3, −d4*} and a second coded symbol {d4, d3*}. At time T1, the first symbol {d3, −d4*} produced by coding the second pair is provided to modulator 350, for transmission with a second polarization state (different than the first). At time T2, the second symbol {d4, d3*} produced by coding the second pair is provided to modulator 350, for transmission with the second polarization state.

Figure 4:
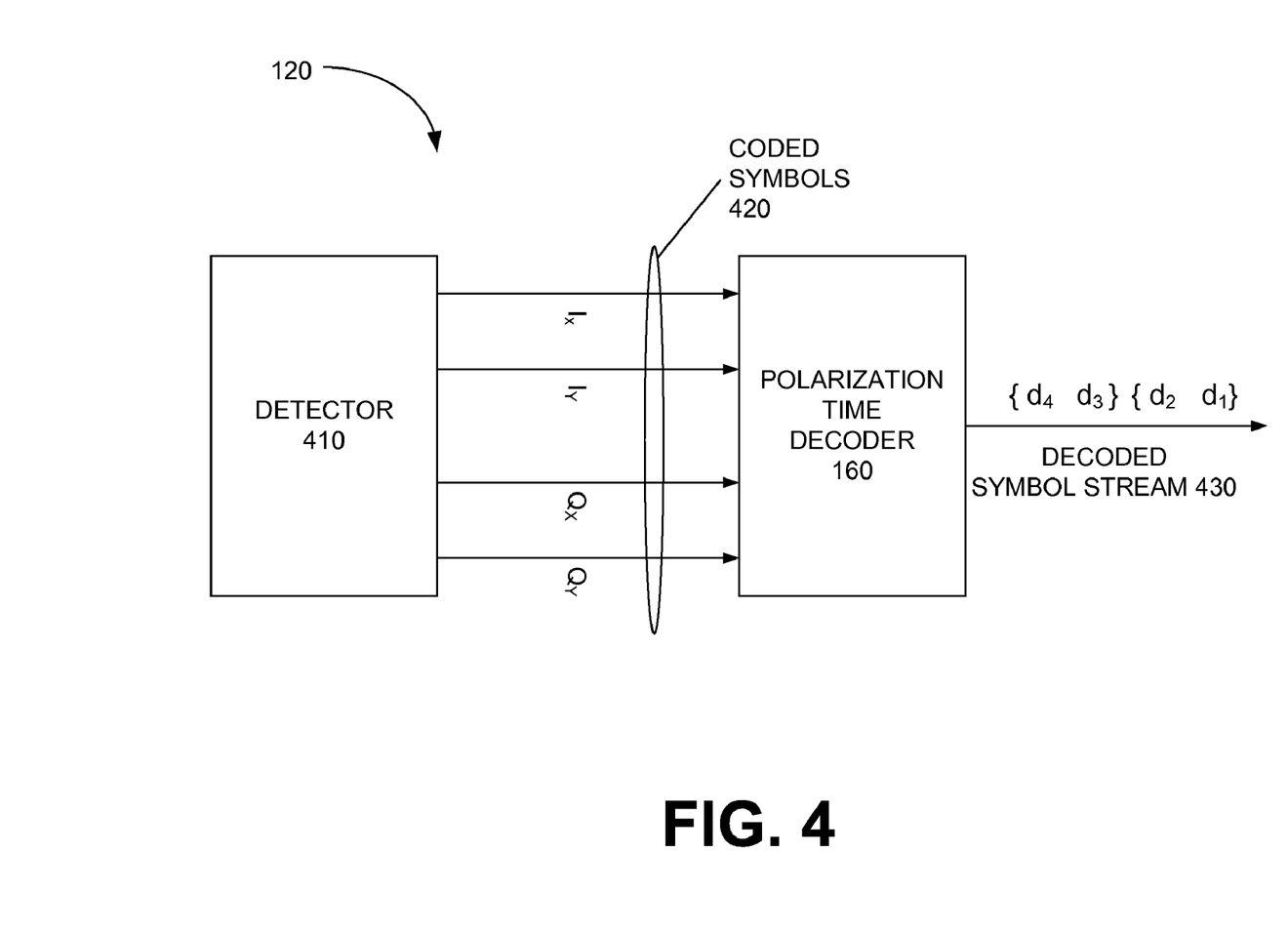
FIG. 4 is a block diagram of the optical receiver of FIG. 1, showing further details of the operation of the polarization time decoder from FIG. 1.

FIG. 4 is a block diagram of optical receiver 120 from FIG. 1, showing further details of the operation of polarization-time decoder 170. Although transmitter 110 transmits using two different polarization states, optical receiver 120 includes a single coherent detector and is polarization insensitive. This example embodiment includes a coherent receiver at x-polarization, but receivers using other polarization states are also contemplated. A coherent detector 410 detects in-phase and quadrature components, which are represented as a stream of coded symbols 420. Polarization-time decoder 170 performs the inverse of the coding procedure used by encoder 160 to produce a stream of decoded symbols 430. The decoded symbols 430 are then mapped to a bit stream (corresponding to the original bit stream received by optical transmitter 110).

The detection and decoding process will now be described in further detail. The relationship between the transmitted optical fields $E_x$ and $E_y$ (produced by optical transmitter 110) and the optical fields $E'_x$ and $E'_y$ (received by optical receiver 120) is described by:

$$\begin{pmatrix} d'_1 \\ d'^*_2 \end{pmatrix} = L \begin{pmatrix} J_{11} & J_{12} \\ J^*_{12} & -J^*_{11} \end{pmatrix} \begin{pmatrix} d_1 \\ d_2 \end{pmatrix} \quad \text{(Equation 1)}$$

where L is a real scalar describing the linear optical loss and the Jones matrix J describes the polarization change during the fiber transmission. Using Eq. 1, the relationship between the received symbols {(d'₁, d'₂), (d'₃, d'₄) . . . } and the transmitted symbols {(d₁, d₂), (d₃, d₄) . . . } can be described as $$d'_1 = L(J_{11} \quad J_{12}) \begin{pmatrix} d_1 \\ d_2 \end{pmatrix}$$

and

-continued $$d'_2 = L(J_{11} \quad J_{12}) \begin{pmatrix} -d^*_2 \\ d^*_1 \end{pmatrix},$$

where a single coherent receiver at X-polarization is used.

The two equations are rearranged into a 2×2 matrix:

$$\begin{pmatrix} d'_1 \\ d'^*_2 \end{pmatrix} = L \begin{pmatrix} J_{11} & J_{12} \\ J^*_{12} & -J^*_{11} \end{pmatrix} \begin{pmatrix} d_1 \\ d_2 \end{pmatrix} \quad \text{(Equation 2)}$$

In this manner, a virtual 2×2 PMIMO system is derived from the initial 2×1 PMIMO system, where the decoding process is independent of the polarization state of the received signal. Polarization-time decoder 170 operates by performing the matrix operation described by Eq. 2 on the received symbols {(d'₁, d'₂), (d'₃, d'₄) . . . }.

The Jones matrix J used in the computations of decoder 170 is obtained by detector 410 using a channel estimation algorithm, such as a least-mean-squares or other algorithm known to a person of ordinary skill in the art. In some embodiments, the Jones matrix J for the entire frame is estimated using a training sequence in the preamble of each frame, which removes polarization crosstalk.

The polarization of lightwave in fiber generally drifts with the time due to environmental variation, but the rate of this polarization drift is generally much slower than the transmission data rate. One embodiment of polarization-time decoder 170 uses least-mean-squares to estimate J as follows:

$$J_i = J_{i-1} + \mu \times \left[ \begin{pmatrix} E'_x \\ E'_y \end{pmatrix} \bigg|_i - J_{i-1} L \begin{pmatrix} E_x \\ E_y \end{pmatrix} \bigg|_i \right] \times L \begin{pmatrix} E_x \\ E_y \end{pmatrix} \bigg|_i,$$

$i \geq 0, J - 1 = \text{initial guess}$ where μ refers to a positive step-size, i refers to the label of training sequences, and L can be obtained from the received average power.

Figure 5:
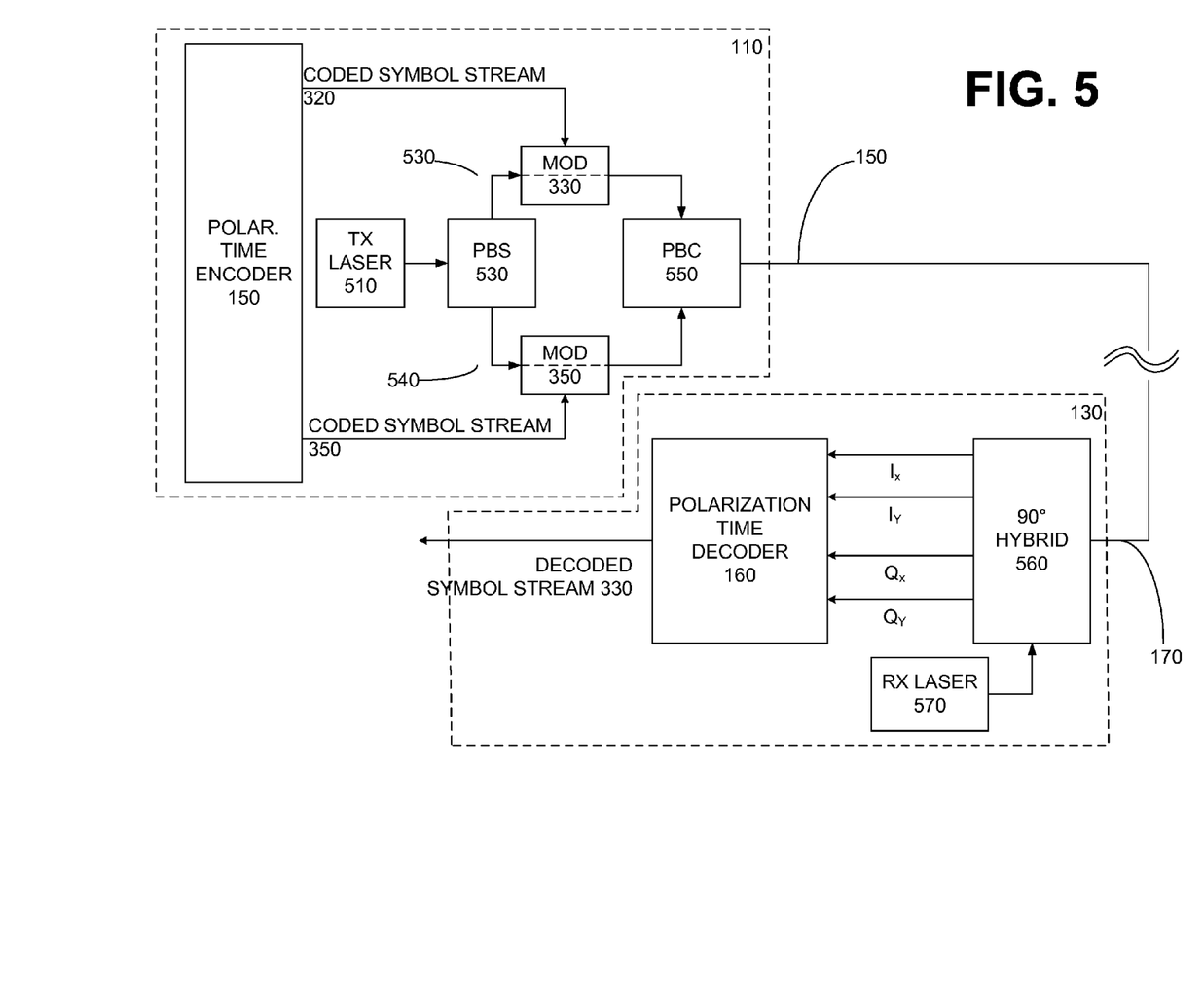
FIG. 5 is a block diagram of selected components of the transmitter and receiver from FIG. 1, showing further details of the optical components.

FIG. 5 is a block diagram of selected components of optical transmitter 110 and optical receiver 120 from FIG. 1, showing further details of the optical components. Transmission laser 510 produces a beam which is split by a polarization beam splitter (PBS) 520 into a first polarized light beam 530 having one polarization state, and a second polarized light beam 540 having another polarization state. First polarized light beam 530 is modulated by modulator 330, according to coded symbol stream 320 produced by polarization-time encoder 160. Second polarized light beam 540 is modulated by modulator 350 according to coded symbol stream 340, also produced by polarization-time encoder 160. Modulated polarized beams 530 and 540 are recombined by polarization beam combiner (PBC) 550 and transmitted along fiber 140.

The polarization of the signal is modified as it passes through optical network 130. The modified signal is received by a 90° optical hybrid 560 which operates as a coherent detector. Using laser 570 as a reference signal, hybrid 560 simultaneously measures the in-phase I'$_x$ and I'$_y$ and quadrature Q'$_x$ and Q'$_y$ components of the received signal. In some embodiments, state of polarization of laser 570 is chosen so that its power is equally split between orthogonal polarizations, and is phase-locked to transmission laser 510.

Using the techniques described above in connection with FIG. 4, the inverse of estimated Jones matrix J (i.e., the conjugate transpose of J) is applied to measured components I'$_x$, I'$_y$, Q'$_x$, and Q'$_y$ to recover the transmitted components I$_x$, I$_y$, Q$_x$ and Q$_y$. The recovered components, representing coded symbols, are then decoded into the originally transmitted symbols. In some embodiments, the received signal polarization estimation and tracking is performed by in the electrical domain (e.g., by an algorithm executed on a digital signal processor), so that no optical dynamic polarization control is required at optical receiver 120.

Figure 6:
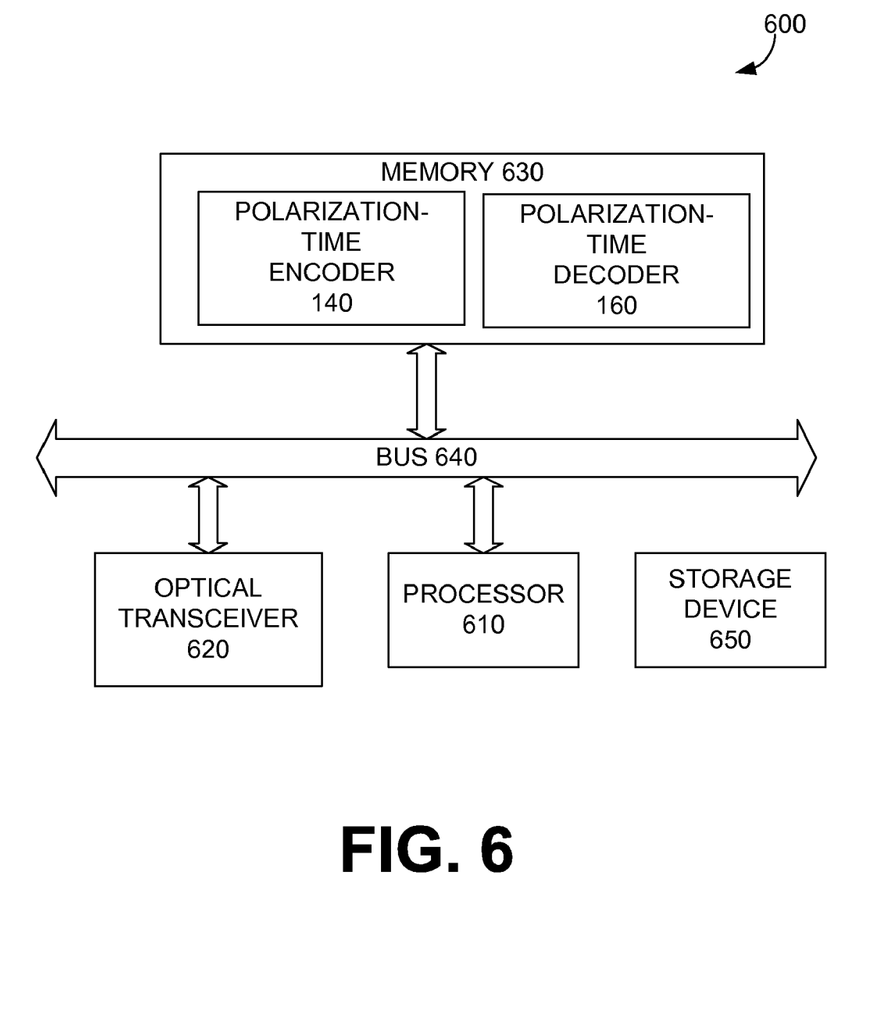
FIG. 6 is a hardware block diagram of a computing device which can be used to implement various embodiments systems and methods of polarization time coding for optical communications

FIG. 6 is a hardware block diagram of a computing device 600 which can be used to implement various embodiments of systems and methods of polarization time coding for optical communications. Computing device 600 contains a number of components that are well known in the computer arts, including a processor 610 (e.g., microprocessor, digital signal processor, network processor), an optical transceiver 620, and memory 630 These components are coupled via a bus 640. Some embodiments also include a storage device 650, such as non-volatile memory or a disk drive. In the embodiment of FIG. 6, polarization-time encoder 160 and polarization-time decoder 170 reside in memory 630 as instructions which, when executed by processor 610, implement systems and methods of polarization time coding for optical communications. Omitted from FIG. 6 are a number of conventional components that are unnecessary to explain the operation of computing device 600.

In other embodiments (not shown), polarization-time encoder 160, polarization-time decoder 170, or both, are implemented in hardware, including, but not limited to, a programmable logic device (PLD), programmable gate array (PGA), field programmable gate array (FPGA), an application-specific integrated circuit (ASIC), a system on chip (SoC), and a system in package (SiP).

Polarization-time encoder 160, polarization-time decoder 170, or both can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or that is based on electronic, magnetic, optical, electromagnetic, infrared, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method of polarization-time coding in an optical communication device, the method comprising:
   receiving, at a polarization-time encoder in the optical communication device, a first input pair containing d1, d2 indicating a first polarization state and a second input pair containing d3, d4 indicating a second polarization state;
   transforming, at the polarization-time encoder in the optical communication device, each input pair according to a matrix to produce four output pairs comprising a first output pair containing d1, −d2*, a second output pair containing d2, d1*, a third output pair containing d3, −d4*, and a fourth output pair containing d4, d3*;
   transmitting, by an optical transceiver in the optical communication device, at a first time the first output pair containing d1, −d2* using the first polarization state and the third output pair containing d3, −d4* using the second polarization state; and
   transmitting, by the optical transceiver in the optical communication device, at a second time the second output pair containing d2, d1* using the first polarization state and the fourth output pair containing d4, d3* using the second polarization state.

2. A method of polarization-time coding in an optical communication device, the method comprising:
   receiving, at a polarization-time encoder in the optical communication device, a first input pair containing d1, d2 indicating a first polarization state and a second input pair containing d3, d4 indicating a second polarization state;
   transforming, at the polarization-time encoder in the optical communication device, each input pair according to a matrix to produce four output pairs comprising a first output pair containing d1, −d2*, a second output pair containing d2, d1*, a third output pair containing d3, −d4*, and a fourth output pair containing d4, d3*;
   transmitting, by an optical transceiver in the optical communication device, at a first time the first output pair containing d1, −d2* using the first polarization state and the third output pair containing d3, −d4* using the second polarization state; and
   transmitting, by the optical transceiver in the optical communication device, at a second time the second output pair containing d2, d1* using the first polarization state and the fourth output pair containing d4, d3* using the second polarization state;
   modulating a first light beam having the first polarization state to transmit at the first time the first output pair d1, −d2* and to transmit at the second time the second output pair d2, d1*; and
   modulating a second light beam having the second polarization state to transmit at the first time the third output pair d3, −d4* and to transmit at the second time the fourth output pair d4, d3*.

3. The method of claim 2, further comprising:
   combining the first and the second beam after modulation.

4. The method of claim 2, further comprising:
   splitting a beam provided by a light source into the first beam and the second beam.

5. The method of claim 1, wherein the method is implemented by a digital signal processor.

* * * * *